United States Patent [19]

McMillan

[11] Patent Number: 4,766,297
[45] Date of Patent: Aug. 23, 1988

[54] DUAL MODE STATIONARY AND PORTABLE SCANNING SYSTEM

[75] Inventor: Robert M. McMillan, Carrollton, Tex.

[73] Assignee: Recognition Equipment Incorporated, Irving, Tex.

[21] Appl. No.: 1,806

[22] Filed: Jan. 8, 1987

[51] Int. Cl.$^4$ .............................................. G06K 7/10
[52] U.S. Cl. .................................. 235/455; 235/462; 235/470; 235/474
[58] Field of Search ............... 235/435, 439, 454, 455, 235/462, 470, 474

[56] References Cited

U.S. PATENT DOCUMENTS

| | | | |
|---|---|---|---|
| 4,101,072 | 7/1978 | Weaver et al. | 235/455 |
| 4,369,361 | 1/1983 | Swartz et al. | 235/470 |
| 4,387,297 | 6/1983 | Swartz et al. | 235/462 |
| 4,578,571 | 3/1986 | Williams | 235/472 |

*Primary Examiner*—Patrick R. Salce
*Assistant Examiner*—Anita M. Ault
*Attorney, Agent, or Firm*—Richards, Harris, Medlock & Andrews

[57] ABSTRACT

A scanning system (10) for reading bar code symbols including a portable hand-held scanning device (12) is provided. The portable hand-held scanning device (12) generates electrical signals descriptive of the bar code symbols and includes a manually actuatable trigger switch (26) for initiating reading of the bar code symbols each time the manually actuatable trigger switch (26) is actuated by the user when the portable hand-held scanning device (12) is supported by the user. The scanning system (10) further includes a fixture (14) for receiving and supporting the portable hand-held scanning device (12). The fixture includes a head portion (42) and a base portion (40). The hand-held scanning device (12) is supported by the head portion (42) a predetermined distance above the base portion (40) to allow objects bearing the bar code symbols to pass between the head portion (42) and the base portion (40). The fixture (14) further includes structure (64, 66, 70) for sensing the presence of an object between the head portion (42) and the base portion (40) and for automatically initiating reading by the portable hand-held scanning device (12) of the bar code symbols each time the sensing structure (64, 66, 70) senses the presence of an object when the portable hand-held scanning device (12) is supported by the fixture (14).

14 Claims, 2 Drawing Sheets

DUAL MODE STATIONARY AND PORTABLE SCANNING SYSTEM

TECHNICAL FIELD

This invention relates to bar code scanners, and more particularly to a bar code scanning system in which a portable hand-held scanner can be interchangably utilized in a portable mode of operation or a stationary mode of operation.

BACKGROUND ART

Bar code symbols have become widely used in many industries, such as, for example, grocery and food processing, retail department stores, industrial inventory tracking, document control and many other data control applications. Various bar code readers utilizing several illumination sources have been developed to scan and decode symbol patterns and generate multiple digit representations to be used typically as inputs to computers for automatic processing. Bar codes comprise a very error-free method of manually entering data into a computer.

Bar code readers have generally been classified into two categories. The first category is a lightweight portable hand-held scanner which can be supported in the hand of a user. The user positions the hand-held scanner within a predetermined distance from the object bearing the bar code, manually actuates the scanner to initiate reading and then moves the scanner to additional objects. The second category of bar code scanners are those which are stationary or built into an immovable structure such as a supermarket counter. These scanners are referred to as point-of-sale or tabletop scanners and may utilize a moving beam or fixed beam. Objects bearing the bar code are oriented by the user and are moved through the system for reading of the bar code.

Both the portable hand-held scanners and the stationary scanners have inherent deficiencies. The hand-held portable scanner, although being lightweight, is not always convenient to use in assembly-line applications where the user is processing coded objects over extended periods of time and where it is necessary to use both hands of the user to manipulate the objects. In some applications, the handheld scanners are difficult to manipulate while simultaneously moving the objects or performing other tasks at a point-of-sale terminal. Stationary scanners, on the other hand, allow the operator's use of both hands for manipulating objects bearing the bar code to be read which may increase the operator's efficiency in scanning objects. However, stationary bar code scanners are generally heavy, large in size or inconvenient to be brought into scanning installations.

A need has thus arisen for a bar code scanning system that incorporates the advantages of both a hand-held scanner as well as a stationary or fixed scanner which can be used in either of these modes of operation. With such a system, the reading of printed bar code information for automatic data entry can be accomplished by using a hand-held scanner to read the data by moving the scanner to the object or alternatively bringing the object to the scanner in its fixed mode of operation. Such a scanning system eliminates the need for two types of scanning systems at a single work station and minimizes the deficiencies of either a single hand-held portable scanning unit and a fixed scanning unit.

DISCLOSURE OF THE INVENTION

In accordance with the present invention, a scanning system for reading symbols such as, for example, bar codes, is provided which substantially eliminates the problems heretofore associated with the use of individual hand-held scanning devices and fixed scanning units by combining both aspects of these units into a single scanning system.

In accordance with one aspect of the present invention, a scanning system for reading symbols is provided. The scanning system includes a portable hand-held scanning device for generating electrical signals descriptive of the symbol. The hand-held scanning device includes a manually actuatable trigger for initiating reading of the symbols each time the trigger is manually actuated by the user when the portable hand-held scanning device is supported by the user. The system further includes a fixture for receiving and supporting the portable hand-held scanning device. The fixture includes a head portion and a base portion. The hand-held scanning device is supported by the head portion of the fixture, a predetermined distance above the base, to allow objects bearing the symbols to pass between the head portion and the base portion. The fixture includes a sensor interconnected to the portable hand-held scanning device for sensing the presence of an object between the head portion and the base portion and for automatically initiating reading by the portable hand-held scanning device of the symbols each time the sensor senses the presence of an object when the portable hand-held scanning device is supported by the fixture.

In accordance with another aspect of the present invention, a scanning system for reading bar code symbols having a scanner selectively supported by a user throughout the reading of the symbols or alternatively maintained in a fixed position not supported by the user throughout the reading of the symbol is provided. The scanning system includes a portable, lightweight hand-held scanning device for generating electrical signals indicative of the intensity of reflected light from the symbols. The hand-held scanning device includes a housing, a light source mounted within the housing for generating a light beam, optical structure mounted within the housing for directing the light beam along a path towards the bar code symbol, a scanner mounted in the housing for cyclically sweeping the light beam across the bar code symbol, a sensor mounted within the housing for detecting the intensity of light reflected from the bar code symbol and for generating an electrical signal indicative of the detected intensity of the reflected light and a signal processor mounted within the housing for processing the electrical signal for generating electrical signals descriptive of the bar code symbol. The hand-held scanning device further includes a manually actuatable trigger for initiating reading of the symbols each time the trigger is actuated by the user when the hand-held scanning unit is supported by the user. The scanning system further includes a fixture for receiving and supporting the hand-held scanning device in a fixed position without user support. The fixture includes a head portion and a base portion spaced apart with structure interconnecting the head portion and the base portion. The space between the head portion and the base portion defines an area through which objects bearing the symbols may pass. The scanning unit is positioned within the fixture such that the light beam generated is directed towards the base portion. The fixture further includes a sensor interconnected to the scanning device for sensing the presence of an object in the area and for automatically initiating reading by the scanning device of the symbols each time the sensor detects the presence of an object in the area when the scanning unit is being supported by the fixture.

DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION

Figure 1:
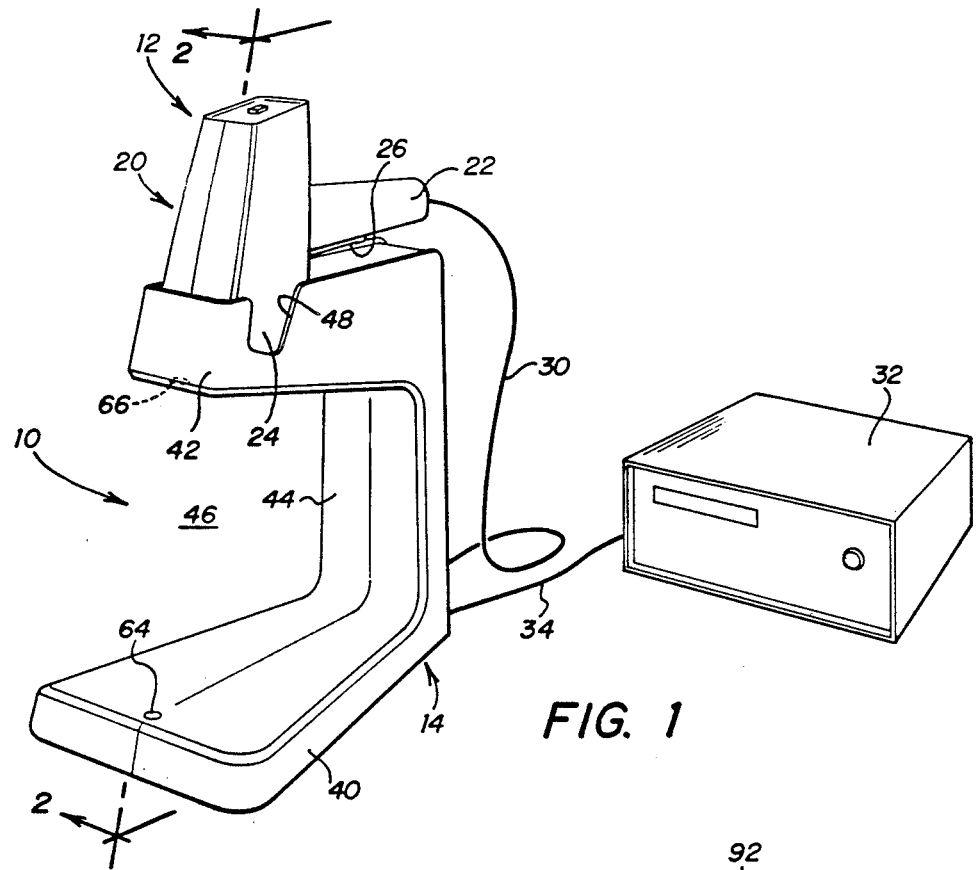
FIG. 1 is a perspective view of the present scanning system.
Figure 2:
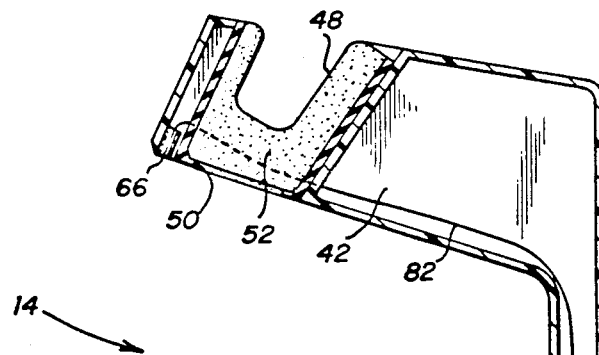
FIG. 2 is a sectional view of the fixture of the present scanning system taken generally along sectional lines 2—2 of FIG. 1 with the hand-held scanning device removed.

Referring simultaneously to FIGS. 1 and 2, the present scanning system is illustrated, and is generally identified by the numeral 10. Scanning system 10 includes a lightweight portable hand-held scanning device generally identified by the numeral 12 and a fixture, generally identified by the numeral 14. Hand-held scanning device 12 operates in a portable mode of operation when supported in the hand of a user such that scanning device 12 is generally moved by the user to an object to read printed information contained on the object. Alternatively, when hand-held scanning device 12 is positioned within fixture 14, as shown in FIG. 1, the present scanning system allows the user to use hand-held scanning device 12 in a stationary mode of operation thereby allowing the user to bring objects bearing printed information to be read to a position adjacent to fixture 14 for scanning and reading. It therefore can be seen that the present scanning system 10 allows for dual operation, portable and stationary, of a scanning unit utilizing a single portable hand-held scanning device Portable hand-held scanning device 12 may comprise for example, a scanning device manufactured and sold by Recognition Equipment Incorporated, Irving, Texas under the trademark BEAM READER; a scanning device described and claimed in U.S. Pat. No. 4,387,297 issued to Swartz, et al. on June 7, 1983 and entitled "Portable Laser Scanning System and Scanning Methods"; or a scanning device described and claimed in U.S. Pat. No. 4,578,571 issued to Williams on March 25, 1986 and entitled "Portable Bar Code Scanning Device and Method". The description of the operation and disclosure of the scanning devices shown in U.S. Pat. Nos. 4,387,297 and 4,578,571 are hereby incorporated by reference into the present application as if fully set forth herein. The illumination source of the present hand-held scanning device 12 may comprise, for example, a high intensity light emitting diode as described in the '571 patent or a laser source as described in the '297 patent or any other suitable source that provides sufficient resolution of the symbols being scanned.

The present scanning system is generally utilized for reading and/or analyzing bar code symbols, although the present scanning system is not limited to such use. Bar code symbols comprise a series of lines and spaces of varying widths, which pattern the codes to a multiple digit representation characteristic of the product bearing the symbol. Typical symbol bar codes read by the present scanning system 10 include the Universal Product Code (UPC), EAN, JAN, Code 3 of 9, 2 of 5, Interleaved 2 of 5 and Codabar.

Portable hand-held scanning device 12 includes a generally handgun-shaped housing, generally identified by the numeral 20. Housing 20 includes a handle portion 22 which has an overall size such that handle portion 22 can conveniently fit into the palm of a user's hand. Housing 20 further includes a barrel portion 24 which is interconnected to handle portion 22. Mounted within handle portion 22 is a trigger switch 26 which is manually actuatable by the user to initiate reading of a symbol each time the trigger switch 26 is manually actuated by the user. Manual actuation of trigger switch 26 is performed in the portable mode of operation of the present scanning system 10.

Portable hand-held scanning device 12 is interconnected via a cable 30 to a decoder unit 32. Decoder unit 32 provides a positive potential and ground potential voltages to hand-held scanning device 12 and functions to generate an acknowledgement signal to hand-held scanning device 12 which automatically deactivates the reading operation and signals the user with an audible tone and/or a visible status indicator that reading of a bar code has been accomplished. Decoder unit 32 further contains an interface to point-of-sale devices and computer terminals. Cable 30 of hand-held scanning device 12 is inserted directly into decoder unit 32 for use in the portable mode of operation of the present scanning system 10. As shown in FIG. 1, cable 30 is interconnected to fixture 14 for use in the stationary mode of operation of the present scanning system 10, and decoder unit 32 is interconnected to fixture 14 using a cable 34.

Disposed within housing 20 is an illumination source for illuminating the bar code symbols. As previously stated, the illumination source may comprise, for example, a light-emitting diode or a laser such as a laser diode for generating a light beam. Housing 20 further includes optic structure for directing the light beam along a path through an outlet port in housing 20 towards the bar code symbol to be scanned. A scanning device is further mounted within housing 20 for cyclically sweeping the light beam across the bar code symbol. Various scanning devices can be utilized with the present hand-held scanning device 12 such as, for example, rotating mirrors driven by motors or various bimorph scanning oscillating elements. Housing 20 further includes a sensor for detecting the intensity of light reflected from the bar code symbol and for generating an electrical signal indicative of the detected intensity of the reflected light. A signal processor may also be associated with housing 20 for generating an electrical signal descriptive of the bar code symbol scanned and read. For a more detailed description of the operation of hand-held scanning device 12 reference is made to U.S. Pat. Nos. 4,387,297 or 4,578,571 which describe the operation of a portable hand-held scanning device which operates independent of the present fixture 14 for portable operation.

Fixture 14 includes a base portion 40, a head portion 42 and an arm 44. Arm 44 interconnects base portion 40 and head portion 42 in a spaced apart relationship to define an area 46 through which objects bearing the bar code symbol to be read are passed. The overall height of fixture 14 from the top of head portion 42 to the top of base portion 40 may be in the range of approximately 12 inches. The area 46 through which objects may pass under head portion 42 may be dimensioned to be approximately 9 inches.

In operating the present scanning system 10 in the stationary mode of operation, portable hand-held scanning device 12 is inserted into head portion 42. Head portion 42 includes a channel 48 for slidably receiving barrel portion 24 of housing 20 of portable hand-held scanning device 12. Scanning device 12 is thereby received and supported within fixture 14 for the stationary mode of operation of scanning system 10. Scanning device 12 is securely supported within channel 48 of head portion 42 which also includes a port 50. Port 50 allows the light beam to be directed to the bar code and allows scanning device 12 to receive reflected light from the bar code. Channel 48 is lined with a rubber surface 52 to securely support hand-held scanning device 12 as well as protect the exterior surface of housing 20. In the stationary mode of operation, cable 30 is inserted into a connector 54 located within arm 44 rather than being interconnected directly to decoder unit 32. Cable 34 extending from decoder unit 32 is interconnected to fixture 14 through a connector 56. An important aspect of the present invention is that portable hand-held scanning device 12 requires no modification from the portable mode of operation when used in the stationary mode of operation.

In the stationary mode of operation of the present scanning system 10, the user does not support hand-held scanning device 12 and therefore the user does not actuate trigger switch 26 to initiate reading of the bar code symbol. Fixture 14 in the stationary mode of operation performs the function of initiating the reading operation without actuation of trigger switch 26. In this manner, hand-held scanning device 12 operates completely automatically without user interaction. The automatic initiating of the reading operation is performed in part through an object sensing system for sensing objects within area 46. The object sensing system is incorporated within fixture 14 and includes a light emitter positioned within base portion 40 and a light detector 66 positioned within head portion 42 of fixture 14. The relative positions of light emitter 64 and light detector 66 can be reversed without effecting the operation of the present object sensing system whose purpose is to generate a light beam between base portion 40 and head portion 42 of fixture 14.

Fixture 14 includes a trigger circuit 70 (FIG. 3) mounted to a printed circuit board 72 contained within base portion 40. Trigger circuit 70 functions to detect whether the light beam established by light emitter 64 is broken thereby indicating that an object is present within area 46 and further generates a signal to hand-held scanning device 12 to automatically initiate reading of the bar code symbol. Trigger circuit 70 therefore functions in an analogous manner to trigger switch 26 of hand-held scanning device 12 to initiate reading of the bar code symbol. In the stationary mode of operation, reading is initiated with the presence of an object in area 46 which is detected by trigger circuit 70 due to a break in the beam established by light emitter 64.

Light emitter 64 may comprise, for example, a gallium arsenide infrared light emitting diode such as a Model SE5455-3 manufactured and sold by Honeywell, Inc. of Richardson, Texas. Light detector 66 may comprise, for example, an infrared detector, Model No. SD5600, manufactured and sold by Honeywell, Inc., Richardson, Texas. Light emitter 64 is interconnected to trigger circuit 70 via a cable 80 disposed within base portion 40 of fixture 14. Light detector 66 is interconnected to trigger circuit 70 via a cable 82 disposed within head portion 42 and arm portion 44 of fixture 14. Printed circuit board 72 is interconnected to connectors 54 and 56 via a cable 84.

Both light emitter 64 and light detector 66 receive power from trigger circuit 70 which is powered from decoder unit 32.

Figure 3:
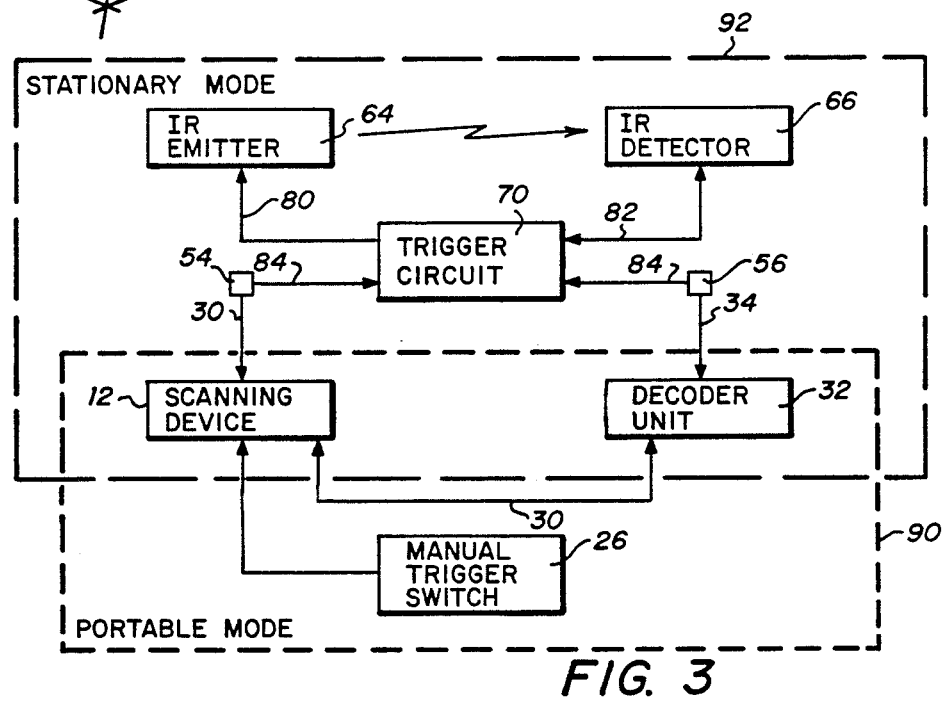
FIG. 3 is a block diagram of the present scanning system illustrating the two modes of operation.

Referring now to FIG. 3, block diagram of the present scanning system 10 is illustrated. The portion of FIG. 3 designated by the numeral 90 represents the components of scanning system 10 for use in the portable mode of operation while the components designated by the numeral 92 represent operation of scanning system 10 in the stationary mode of operation. In the portable mode of operation, scanning device 12 communicates via cable 30 with decoder unit 32. Decoder unit 32 provides a positive potential and ground potential voltages to scanning device 12 as well as an acknowledgement signal upon receipt from scanning device 12 of a trigger signal. Receipt by scanning device 12 of the acknowledgement signal indicates to scanning device 12 that a reading operation has been completed. The trigger signal generated by scanning device 12 is initiated through operation of trigger switch 26 which, although shown as a separate block in FIG. 3, is contained within housing 20 of scanning device 12. Scanning device 12 further provides visual pattern representative of the bar code symbol scanned and read to decoder unit 32.

In the stationary mode of operation, trigger circuit 70 is interconnected to scanning device 12 via cables 84 and 30 and to decoder unit 32 via cables 84 and 34. Trigger circuit 70 receives a positive potential and ground potential voltages from decoder unit 32 for distribution to light emitter 64 and light detector 66. When an object is detected in area 46, light detector 66 generates a signal to trigger circuit 70 which generates a signal to scanning device 12 and decoder unit 32 to automatically initiate reading of the bar code symbol and to inform the decoder unit 32 that reading is taking place by scanning device 12. When the light beam established between light emitter 64 and light detector 66 is reestablished by the object being removed from area 46, the trigger signal being generated by trigger circuit 70 is terminated. Subsequent generation of the trigger signal occurs when the light beam is again broken by the presence of a new object within area 46.

Figure 4:
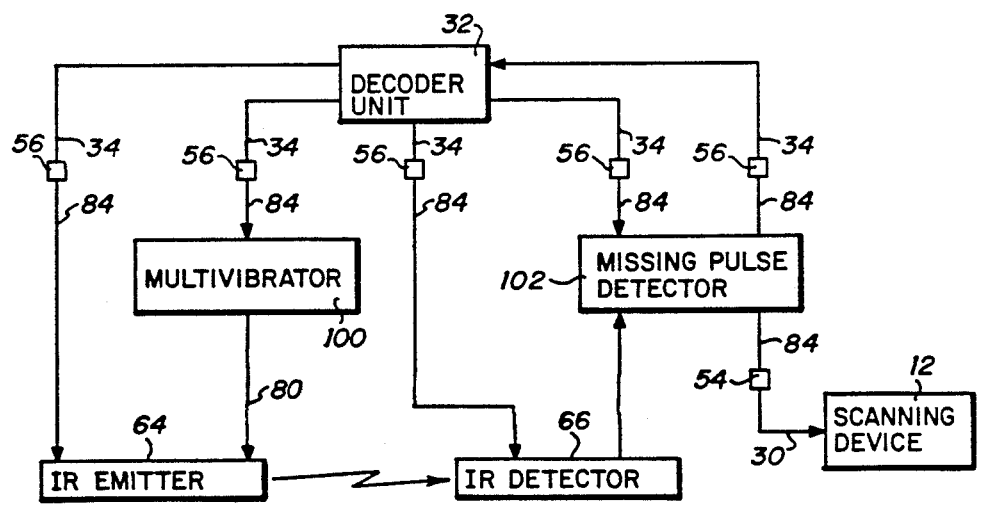
FIG. 4 is a block diagram of the trigger circuit utilized with the scanning system of the present invention in the stationary mode of operation.

FIG. 4 illustrates, in more detail, trigger circuit 70 which includes a multivibrator 100 and a missing pulse detector 102. Multivibrator 100 is a timing circuit for generating an oscillating output pulse of a predetermined frequency and duty cycle for actuating light emitter 64. Where light emitter 64 is an infrared light emitting diode, a pulsed output is generated which is detected by light detector 66. Should the path between light emitter 64 and light detector 66 be blocked, light detector 66 fails to produce an output signal which failure is detected by missing pulse detector 102 which in turn generates the trigger signal applied to decoder unit 32 and scanning device 12 via cables 84, 34 and 30. Multivibrator 100 may comprise, for example, a linear integrated circuit type SE555 manufactured and sold by Texas Instruments, Dallas, Tex., with required external resistors and a capacitor for controlling the frequency and duty cycle. Missing pulse detector 102 may also comprise, for example, type SE555 timer configured to be used as a missing pulse detector. Multivibrator 100 and missing pulse detector 102 can be fabricated in a single linear integrated circuit including dual precision timers such as for example, a type SE556 manufactured and sold by Texas Instruments, Dallas, Tex.

It therefore can be seen that the present scanning system 10 operates in two independent modes of operation. One mode being as a hand-held scanning device supported by a user, with a second mode of operation being a stationary or fixed scanning device being supported by a fixture. In either mode of operation, the scanning device comprises a portable hand-held scanning device and requires no modification in transferring between modes of operation. The present scanning system 10 therefore eliminates the need for two independent types of scanning systems by providing a hand-held and fixed scanning device in a single system. The hand-held scanning device is completely interchangeable between the two modes of operation and no separate operator functions are required to allow for the interchangeability of the scanning device.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A scanning system for reading symbols comprising:
portable hand-held scanning means for generating electrical signals descriptive of the symbols including manually actuable trigger means for initiating reading of the symbols each time said trigger means is manually actuated by the user when said portable hand-held scanning means is supported by the user;
said portable hand-held scanning means, further including:
a housing;
a light source mounted within said housing for generating a light beam;
optic means mounted within said housing for directing said light beam along a path towards the symbol;
scanning means mounted within said housing for cyclically sweeping said light beam across the symbol;
sensor means mounted within said housing for detecting the intensity of light reflected from the symbol, and for generating an electrical signal indicative of the detected intensity of the reflected light;
signal processing means mounted within said housing for processing said electrical signal and for generating said electrical signals descriptive of the symbol; and
handle means for normally supporting said housing in a non-contacting relationsip with the symbol during reading thereof when said scanning means is supported by the user, said manually actuatable trigger means being disposed in said handle means;
fixture means for receiving and supporting said portable hand-held scanning means and including a head portion and a base portion, said hand-held scanning means being supported by said head portion a predetermined distance above said base portion to allow objects bearing the symbols to pass between said head portion and said base portion;
said scanning means housing is generally handgun-shaped and said handle means is dimensioned to be gripped by the hand of a user and wherein said housing further includes a barrel portion connected to said handle portion, said barrel portion being received by said head portion of said fixture means; and
said fixture means further including means interconnected to said protable hand-held scanning means for sensing the presence of an object between said head portion and said base portion and for automatically initiating reading by said portable hand-held scanning means of the symbols without actuation of said manually actuatable trigger means each time said sensing means senses the presence of an object when said portable hand-held scanning means is supported by said fixture means.

2. The scanning system of claim 1 wherein said fixture means further includes:
support means for interconnecting said head portion to said base portion.

3. The scanning system of claim 1 wherein said head portion of said fixture means includes a port for allowing said light beam to be directed along said path towards the symbol and for allowing said light reflected from the symbol to be detected by said sensor means mounted within said housing.

4. The scanning system of claim 1 wherein said object sensor means includes:
a light transmitter for generating a beam of light extending between said base portion and said head portion of said fixture means, such that said object sensor means detects the presence of an object when said beam of light is broken.

5. The scanning system of claim 3 wherein said object sensor means further includes:
a light receiver disposed on said head portion opposite said light transmitter disposed on said base portion of said fixture means.

6. The scanning system of claim 1 wherein said light source comprises a light emitting diode.

7. The scanning system of claim 1 wherein said light source comprises a semiconductor laser diode for generating a laser light beam.

8. A scanning system for reading bar code symbols having a scanner supported by a user throughout the reading of the symbols or alternatively positioned in a fixed position and not supported by the user throughout the reading of the symbols, comprising:
a portable, lightweight hand-held scannning device for generating electrical signals indicative of the intensity of reflected light from the symbols including:
a housing;
a light source mounted within said housing for generating a light beam;
optic means mounted within said housing for directing said light beam along a path towards the bar code symbols;
scanning means mounting within said housing for cyclically sweeping said light beam across the bar code symbols;
sensor means mounted within said housing for detecting the intensity of light reflected from the bar code symbols, and for generating an electrical signal indicative of the detected intensity of the reflected light;

manually actuable trigger means for initiating reading of the bar code symbols each time said trigger means is manually actuated by the user when said scanning device is supported by the user; and handle means for normally supporting said housing in a non-contacting relationship with the bar code symbols during reading thereof, when said scanning means is supported by the user, said manually actuable trigger means being disposed within said handle means;

said scanning means housing is generally handgun-shaped and said handle means is dimensioned to be gripped by the hand of a user and said housing further includes a barrel portion connected to said handle portion;

fixture means for receiving and supporting said scanning device in a fixed position without user support and including:

a head portion;

a base portion spaced apart from said head portion;

means interconnecting said head portion and said base portion to define an area through which objects bearing the symbols may pass, said scanning device being positioned within said fixture means, such that said light beam is directed toward said base portion to intersect objects passing through said area;

said barrel portion of said housing being received by said head portion of said fixture means;

said fixture means further including object sensing means interconnected to said scanning device for sensing the presence of an object in said area for automatically initiating reading by said scanning device of the symbols without actuation of said manually actuable trigger means each time said sensing means senses the presence of an object in said area when said scanning device is being supported by said fixture means; and said object sensing means further including:

a light transmitter mounted in said base portion of said fixture for generating a beam of light; and a light receiver mounted in said head portion of said fixture means substantially opposite said light transmitter for detecting the presence or absence of said light beam, such that said light receiver generates a signal for automatically initiating reading by said scanning device upon a failure to detect said light beam indicating the presence of an object in said area.

9. The scanning system of claim 8 wherein said light transmitter comprises an infrared light emitting diode and said light receiver comprises an infrared detector.

10. The scanning system of claim 8 wherein said light sources comprises a light emitting diode.

11. The scanning system of claim 8 wherein said light source comprises a semiconductor laser diode for generating a laser light beam.

12. A scanning system for reading bar code symbols having a scanner supported by a user throughout the reading of the symbols or alternatively positioned in a fixed position and not supported by the user throughout the reading of the symbols, comprising:

a portable, lightweight hand-held scanning device for generating electrical signals indicative of the intensity of reflected light from the symbols including:

a housing normally supportable by a user at a variable distance from the symbols;

an optical assembly disposed in said housing by coupling means;

a light emitting diode affixed to said assembly for providing a radiant light beam;

telescope means affixed to said assembly and having a field-of-view falling within the intersection of said radiant beam and the bar code symbol;

sensor means affixed to said telescope means for detecting the intensity of reflected light within said field-of-view and for generating an electrical signal indicative of said intensity;

said housing further including a handle portion;

manually actuatable trigger means disposed within said handle portion of said housing for initiating reading of the symbols each time said tirgger means is manually actuated by the user when said scanning device is supported by the user;

said housing being generally handgun-shaped, such that said handle is of a size dimensioned to be gripped by the hand of a user and further having a barrel portion connected to said handle portion;

fixture means for receiving and for supporting said scanning device in a fixed position without user support and including:

a head portion for receiving said barrel portion of said housing of said scanning device;

a base portion spaced apart from said head portion;

means interconnecting said head portion and said base portion to define an area through which objects bearing the symbols may pass, said scanning device being positioned within said fixture means, such that said radiant light beam is directed toward said base portion;

an infrared light emitter mounted within said base portion for generating a beam of light;

an infrared light detector mounted in said head portion substantially opposite said infrared light emitter for detecting the presence or absence of said beam of light, such that said infrared light detector generates a signal for automatically initiating reading by said scanning device without actuation of said manually actuatable trigger means upon a failure to detect said light beam indicating the presence of an object in said area.

13. The scanning system of claim 12 wherein said infrared light emitter further includes timing means for pulsing said infrared light emitter to generate a pulsed output signal.

14. The scanning system of claim 13 wherein said infrared light detector further includes timing means for detecting the absence of a pulse generated by said infrared light emitter.

* * * * *